United States Patent
Donovan et al.

[11] Patent Number: 5,751,612
[45] Date of Patent: May 12, 1998

[54] SYSTEM AND METHOD FOR ACCURATE AND EFFICIENT GEODETIC DATABASE RETRIEVAL

[75] Inventors: Kenneth B. Donovan, Daytona Beach; Richard A. Ferrell, Chuluota; Arthur J. Heidrich, South Daytona; Dominick S. Zirpolo, Port Orange, all of Fla.

[73] Assignee: Lockheed Martin Corporation, Bethesda, Md.

[21] Appl. No.: 519,063

[22] Filed: Aug. 24, 1995

[51] Int. Cl.$^6$ .......................... G06F 9/455; G06F 7/548
[52] U.S. Cl. .............. 364/578; 364/449.1; 395/500; 395/119; 395/952; 434/146
[58] Field of Search ............................. 364/578, 900, 364/452, 443, 449; 434/146; 342/457, 357; 395/119

[56] References Cited

U.S. PATENT DOCUMENTS

| | | | |
|---|---|---|---|
| 3,996,672 | 12/1976 | Osofsky et al. | 35/10.2 |
| 4,343,037 | 8/1982 | Bolton | 364/521 |
| 4,414,643 | 11/1983 | Meyer | 364/900 |
| 4,585,418 | 4/1986 | Stickel | 434/20 |
| 4,715,005 | 12/1987 | Heartz | 364/521 |
| 4,766,555 | 8/1988 | Bennett | 364/518 |
| 4,985,854 | 1/1991 | Wittenburg | 364/522 |
| 5,057,024 | 10/1991 | Sprott et al. | 434/146 |
| 5,075,693 | 12/1991 | McMillan et al. | 342/457 |
| 5,243,530 | 9/1993 | Stanifer et al. | 342/452 |
| 5,359,526 | 10/1994 | Whittington et al. | 364/443 |
| 5,450,329 | 9/1995 | Tanner | 364/449 |
| 5,614,913 | 3/1997 | Nichols et al. | 342/357 |
| 5,633,995 | 5/1997 | McClain | 395/119 |

OTHER PUBLICATIONS

"Estimation and Confidence in Bearings Only Tracking", by Holtsberg et al., IEEE Signals, Systems & Computers, 1991 25th Asilomar Conference, pp. 883–887.

"False Alarm Effects on Estimation in Multitarget Trackers", by A. Berman and A. Hammer, IEEE Transactions on Aerospace and Electronic Systems, vol. 27, No. 4, Jul. 1991, pp. 675–682.

"Development of a Tactical Terrain Analysis System with GIS Technique", by Kim et al., IEEE Geoscience and Remote Sensing, 1994 Symposium, Feb. 1994, pp. 860–862.

"A GIS–Driven Interactive Radar Image Simulation Using EMSARS Model", by Yang et al., IEEE Geoscience and Remote Sensing, 1994 Symposium, Feb. 1994, pp. 857–859.

*Primary Examiner*—Kevin J. Teska
*Assistant Examiner*—Russell W. Frejd
*Attorney, Agent, or Firm*—Rockey, Milnamow & Katz, Ltd.

[57] ABSTRACT

A system and a method for retrieving geographic information stored in geodetic coordinates based on one or more input positions based on nongeodetic coordinates includes a programmable processor in combination with a previously loaded database defined in geodetic coordinates. The processor is coupled to a display device and converts the received query position or positions into geodetic coordinates which are then used to retrieve associated geographic or structural information from the database for display.

43 Claims, 5 Drawing Sheets

(FOR EACH POINT $R_i$ WITHIN BOUNDING REGION)

5,751,612

SYSTEM AND METHOD FOR ACCURATE AND EFFICIENT GEODETIC DATABASE RETRIEVAL

FIELD OF THE INVENTION

The invention pertains to systems and methods for carrying out coordinate transformations. More particularly the invention pertains to such systems and methods usable for simulating visual images as might be seen from a moving object.

BACKGROUND OF THE INVENTION

Many applications such as radar simulation systems, visual image generation systems, and geographic information systems require a method for obtaining geographic data which corresponds to a specified target or query position relative to a reference position. A known query follows: given a reference position in geodetic coordinates (latitude, longitude), find the geographic data for a specified query position where the query position is defined to have a relative ground position in cartesian coordinates, $Q(\Delta X, \Delta Y)$, relative to the reference position.

A prior art method for solving this problem accurately is well known. (DMA Technical Report 8350.2 "DOD World Geodetic System 1984, its Definition and Relationships with Local Geodetic Systems" 9/91) however, it is computationally complex requiring multiple trigonometric functions and an iterative solution method. Since many simulation applications require an immediate solution for large numbers of query positions, the prior art method is too inefficient.

Other prior art solutions have been developed which convert both the reference position and the geographic database from geodetic coordinates to a cartesian coordinate system.

These prior art methods include the following steps:

Step 1) Converting the geographic database from geodetic coordinates to a cartesian coordinate system based on a defined database origin. Multiple conversion methods are well known such as the cylindrical projection, conical projection, and flat plane projection.

Step 2) Converting the reference position from a geodetic position, REF (lat, long), to a cartesian position, REF (X,Y), on the cartesian geographic database.

Step 3) Determining the query position on the cartesian geographic database. $Q(X,Y)=REF(X,Y)+Q(\Delta X, \Delta Y)$.

The prior art method is efficient for large numbers of query points because the determining step requires only additions, and the step of converting the reference position is only performed once for each reference position.

The initial step of converting the geographic database to a cartesian coordinate system is time consuming, but it is typically pre-computed. As a result, the converted geographic database can be used for many positions and query positions.

The prior art approach suffers from several drawbacks. Geographic databases which are stored in geodetic coordinates cannot be accessed directly; they must first be converted to cartesian coordinates (step 1 above). This process requires significant processing time and introduces errors. A second drawback is that the accuracy of the prior art approach degrades, due to errors inherent in any geodetic projection, when the current reference position is displaced from the original position(s) used to convert the geographic database to cartesian coordinates.

Thus, there continues to be a need for improved systems and methods that are capable of efficiently and accurately retrieving information from a database where the query location is represented in incremental form in a cartesian-type coordinate system and information is stored in the database in a different coordinate system. Preferably, such improved systems and methods will be implementable without needing additional, complex or expensive hardware and software.

SUMMARY OF THE INVENTION

In accordance with this invention, efficient and accurate systems and methods for directly accessing geographic data stored in geodetic coordinates, given a specified reference position in geodetic coordinates and query positions, are disclosed. Two disclosed embodiments include:

A system and a method to respond to a query for a ground position in cartesian coordinates relative to the reference position; and A system and a method to respond to a query for a ground position at a ground range sample along a defined direction relative to the reference position.

In one aspect of this invention, a system and a method for simulating the display of a radar system using the latter described method to find the geographic data visible for a simulated radar beam are disclosed. In yet another aspect of this invention, a method is disclosed of using the latter approach to generate a visual image out of a geodetic database.

These and other aspects and attributes of the present invention will be discussed with reference to the following drawings and accompanying specification.

DETAILED DESCRIPTION OF THE PREFERRED EMBODIMENT

Figure 1:
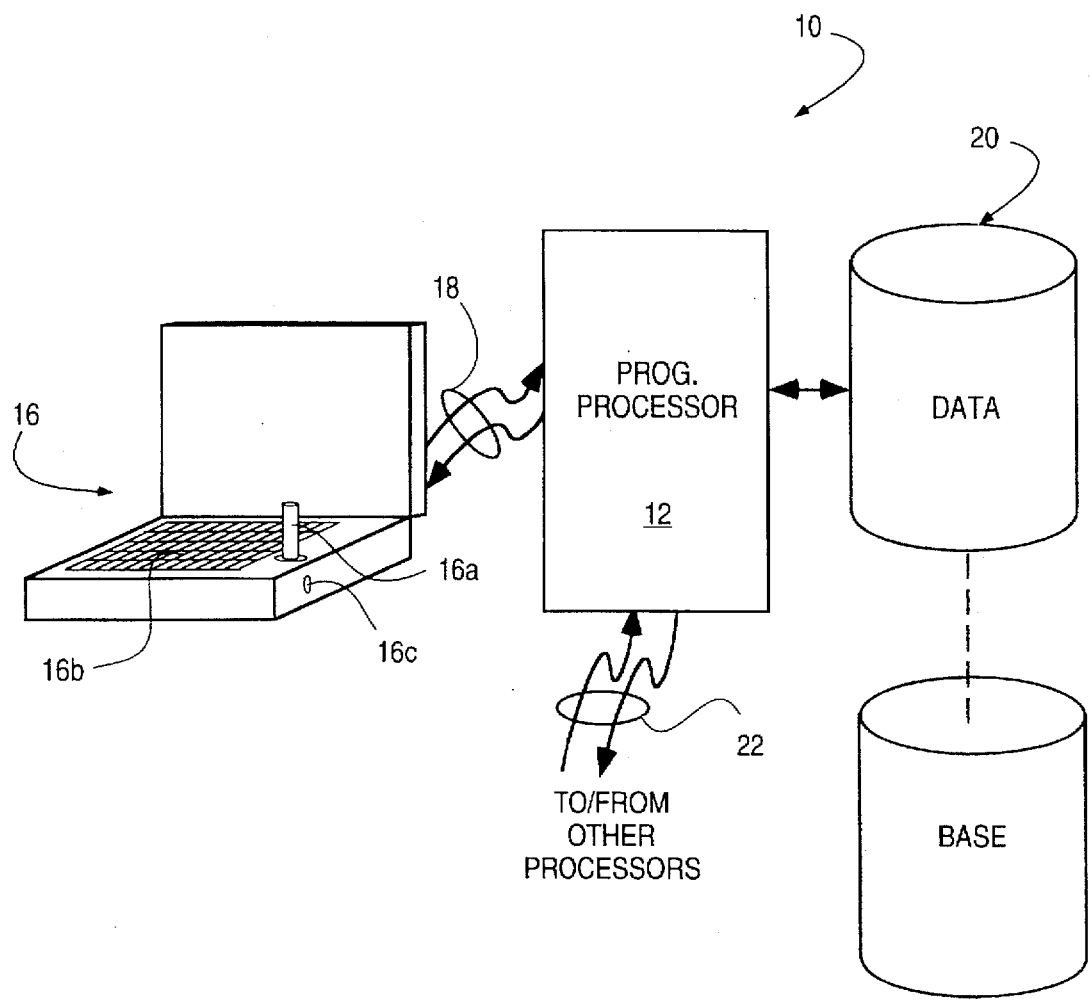
FIG. 1 is a block diagram of a system in accordance with the present invention.

While this invention can be embodied in many different structures or methods there are in the drawing, and will be described herein in detail, specific embodiments thereof. However, the present disclosure is to be considered as an exemplification of the principles of the invention and is not intended to limit the invention to the specific embodiments illustrated.

FIG. 1 illustrates a system 10 in accordance with the present invention. The system 10 includes a programmable processor 12. While the processor 12 in one aspect of the invention could be a standard digital computer which is programmed in accordance herewith, it will be also understood that the processor 12 could be hardwired using a variety of technologies such as programmable logic arrays or the like without departing from the spirit and scope of the present invention.

The system 10 also includes a display 14. The display 14 is intended to provide a visual representation of selected geographical information. The geographical information could represent actual geographic features of physical structures at or in the vicinity of a selected location. Alternately, the display can be that of a fanciful geography of a type created for training, simulation, or game playing purposes.

Associated with the display 14 is a manually operable control apparatus 16 which can include a joy-stick 16a, a keyboard 16b, a track-ball 16c, or other manually operable input devices. The devices 16 enable an operator to establish reference positions and/or selected directions of travel or rates so as to establish the type of geographical information to be presented on the display 14.

The processor 12, the display 14, and the input devices 16, are in bidirectional communication via communication links 18.

Coupled to the processor 12 and in bidirectional communication therewith, is a database 20. The database 20 can be implemented for using an optically based Read Only Memory (ROM) alone or in combination with magnetic media. It will be understood that the exact details of the implementation of the database 20 are not a limitation of the present invention. The geographical information of interest is intended to be stored on the database 20 in a particular, predetermined, coordinate system.

In accordance with the present invention, the system 10 can be used to establish continuously varying geographical images on the display device 14 in response to inputs received from an operator via the apparatus 16. Alternately, inputs can automatically be received, via a bidirectional communications link 22, from another computer or computers.

Figure 2:
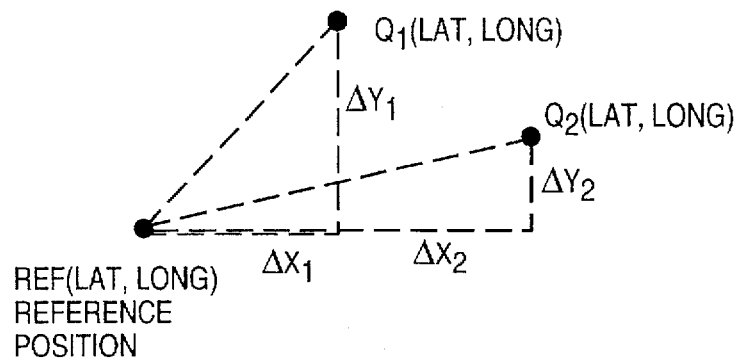
FIG. 2 is a graph which illustrates the problem of determining a ground position in one coordinate system wherein that position is incrementally expressed in another coordinate system and relative to a reference position.

In one scenario wherein the system 10 is usable, as illustrated in FIG. 2, a reference position can be established either automatically or by means of operator input in geodetic coordinates, latitude and longitude. The system 10 is intended to display geographical characteristics and/or structures, prestored in the database 20 which are located at a query point defined incrementally, relative to the reference location, in cartesian coordinates, $\Delta X_1$, $\Delta Y_1$, or $\Delta X_2$, $\Delta Y_2$. In response to such a query, the system 10 determines the latitude and longitude of the requested query points $Q_1$, $Q_2$, based on input information and then retrieves the prestored geographic and/or structural information located at the subject query points.

Figure 3:
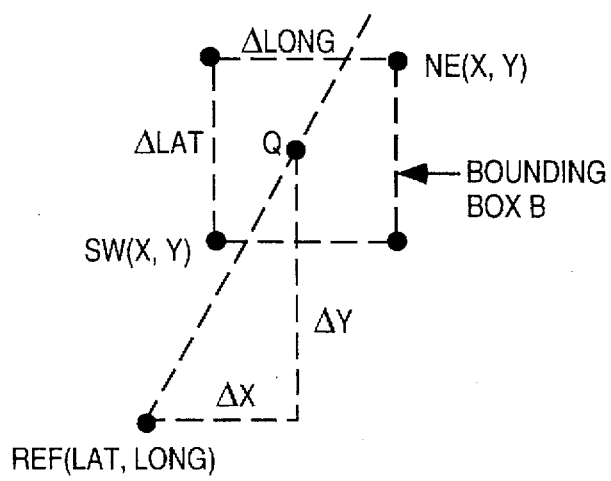
FIG. 3 illustrates a solution in accordance with the present invention to the problem illustrated in FIG. 2.

The process of converting each of the query points to the appropriate latitude and longitude includes, with reference to FIG. 3, the following steps:

1) Determine a geodetic bounding region around the query point Q. The bounding region can be in the form of a square but is not to be limited to a square.
2) For at least two diagonal corners of the bounding region, (e.g. Southwest corner SW and Northeast corner NE), defined in geodetic coordinates, (SW (Lat, Long) and NE (Lat, Long)) find the cartesian coordinates relative to the reference position (SW(X,Y) and NE(X,Y)).
3) Determine the latitude, longitude of the query point Q using interpolation, as shown in FIG. 3.

This method is very efficient when a large number of query points Q must be found within the bounding region. This is because step 3) is the only step which is repeated for each query point Q in the bounding region.

Figure 4:
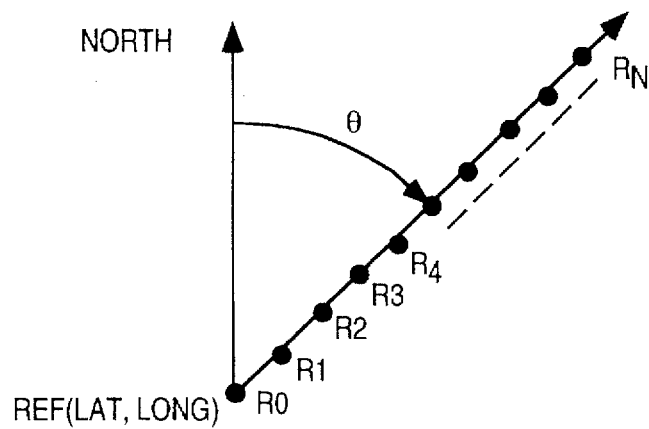
FIG. 4 is a graph which illustrates the problem of determining a plurality of ground positions along a selected ray, relative to a reference position.
Figure 5:
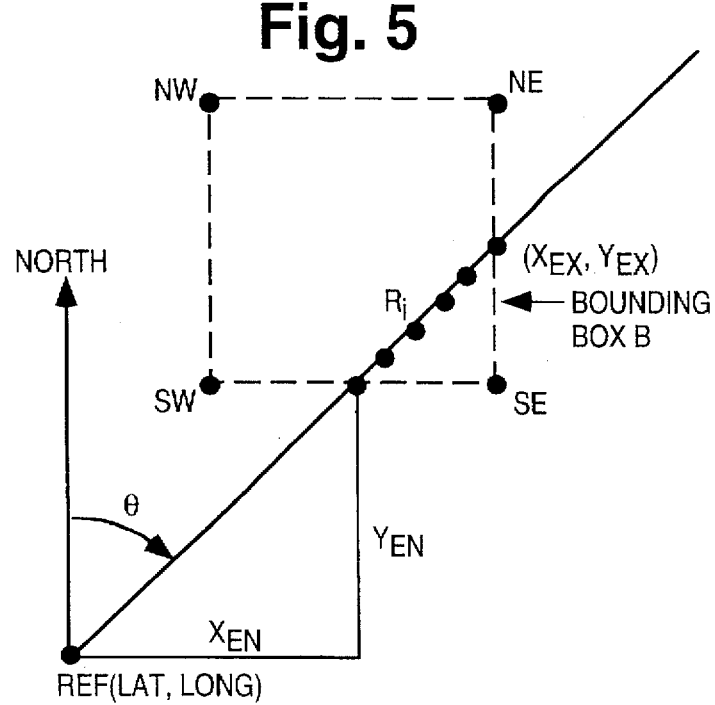
FIG. 5 illustrates a solution in accordance with the present invention to the problem illustrated in FIG. 4.

The appropriate geographic information, corresponding to the query point, now in geodetic coordinates, can be retrieved from the database 20 and presented on the display unit 14. To display a dynamically changing image, for example, as seen by an operator's eye from a radar screen or a moving platform, as illustrated in FIG. 4, a plurality of coordinates, in geodetic form, is determined as described below with respect to FIG. 5.

1) Determine a geodetic bounding region, such as a square, which intersects the direction θ and contains starting point $R_S$.
2) Determine a set of cartesian coordinates relative to the reference position REF for the corners of the bounding region (Northwest corner NW, Northeast corner, NE, etc.).
3) Determine a point where a ray R extending along the direction θ enters the bounding region (Xen,Yen) and exits the bounding region (Xex,Yex) by a standard line intersection calculation.
4) Determine the ground range to enter and exit the bounding box, Ren and Rex where $Ren=(X^2en+Y^2en)^{1/2}$ $Rex=(X^2ex+Y^2ex)^{1/2}$ 5) Determine the geodetic position of Ren using linear interpolation between the two corners SW, SE of the entry edge of the bounding region and the position of Rex using linear interpolation between the two corners SE, NE of the exit edge.
6) Determine the Δ lat, Δ long between Ren and Rex.
7) The lat, long of any point, Ri, which falls between Ren and Rex is then determined by interpolation:

$$Ri(\text{lat, long}) = Ren(\text{lat, long}) + \left( \frac{(\Delta \text{Lat}, \Delta \text{Long})}{(Rex - Ren)} \right)(Ri - Ren)$$

Where Ri corresponds to query point i located in the ray R.

The above described process is very efficient where a large number of points Ri along the Ray R need to be found within a bounding region. This is because only the last step must be repeated for each query point to Ri within the bounding region. The previous steps are performed only once for each bounding region.

It should be noted initially that the first bounding region can be established using an iterative process based on an initial determination taking into account the angle θ. Once an initial region has been located, the next region (along the ray) can be found by moving along the ray R based on the determined output coordinates Xex, and Yex. As a result, the bounding regions will readily track the ray R of interest once the first region has been located.

Figure 6A:
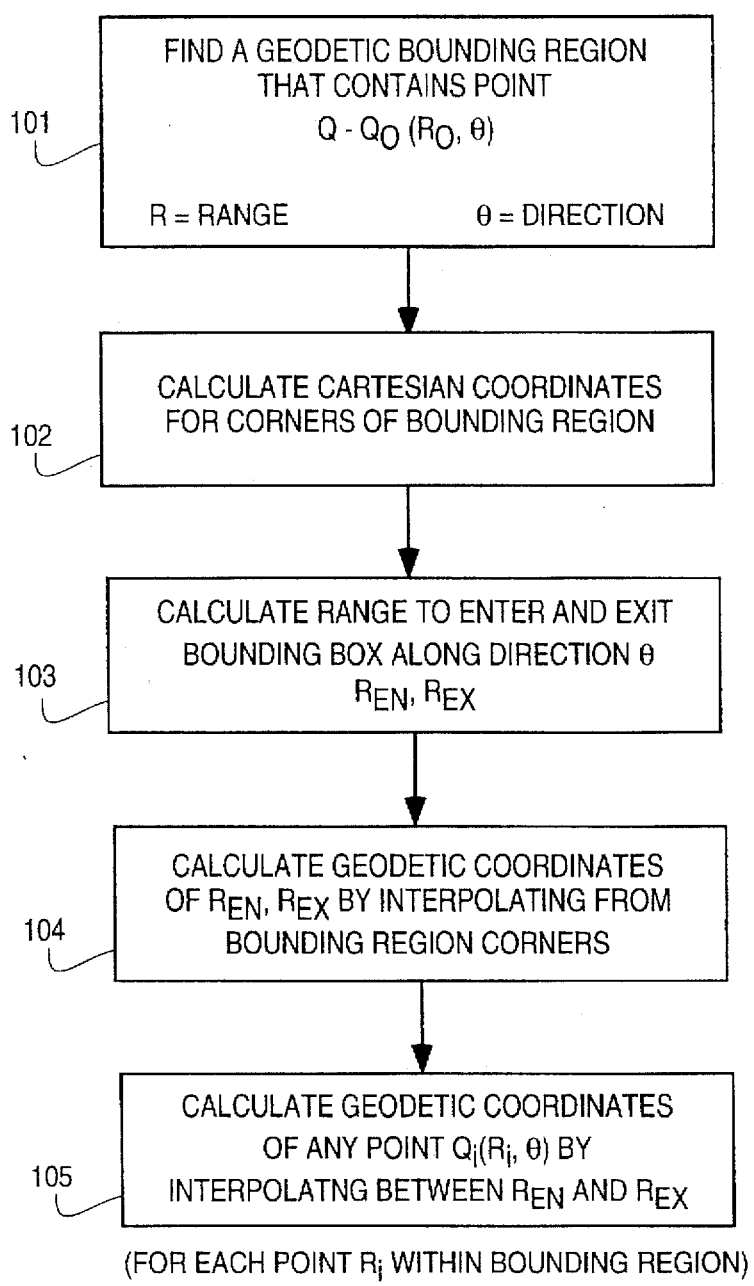
FIG. 6A illustrates a method in accordance with the solution; illustrated in FIG. 5.

FIG. 6A is a block diagram which illustrates in more detail, previously described method steps 1 through 7. In method step 101, corresponding to previously described step 1), the geodetic bounding region is determined. In method step 102, corresponding to previously described step 2), a set of cartesian coordinates is determined relative to the reference position Ref for the corners of the bounding region.

Method step 103, corresponding to previously described step 3), illustrates determination of entry and exit coordinates where the ray R, extending in an angular direction θ, enters and exits the bounding region. In method step 104, corresponding to previously discussed step 4), the geodetic coordinates of the entry and exit points are determined based on the corners of the bounding region. Finally, method step 105, corresponding to steps 5) through 7), previously discussed, illustrates calculating geodetic coordinates for the points Qi which are located on ray R oriented at angle θ.

Figure 6B:
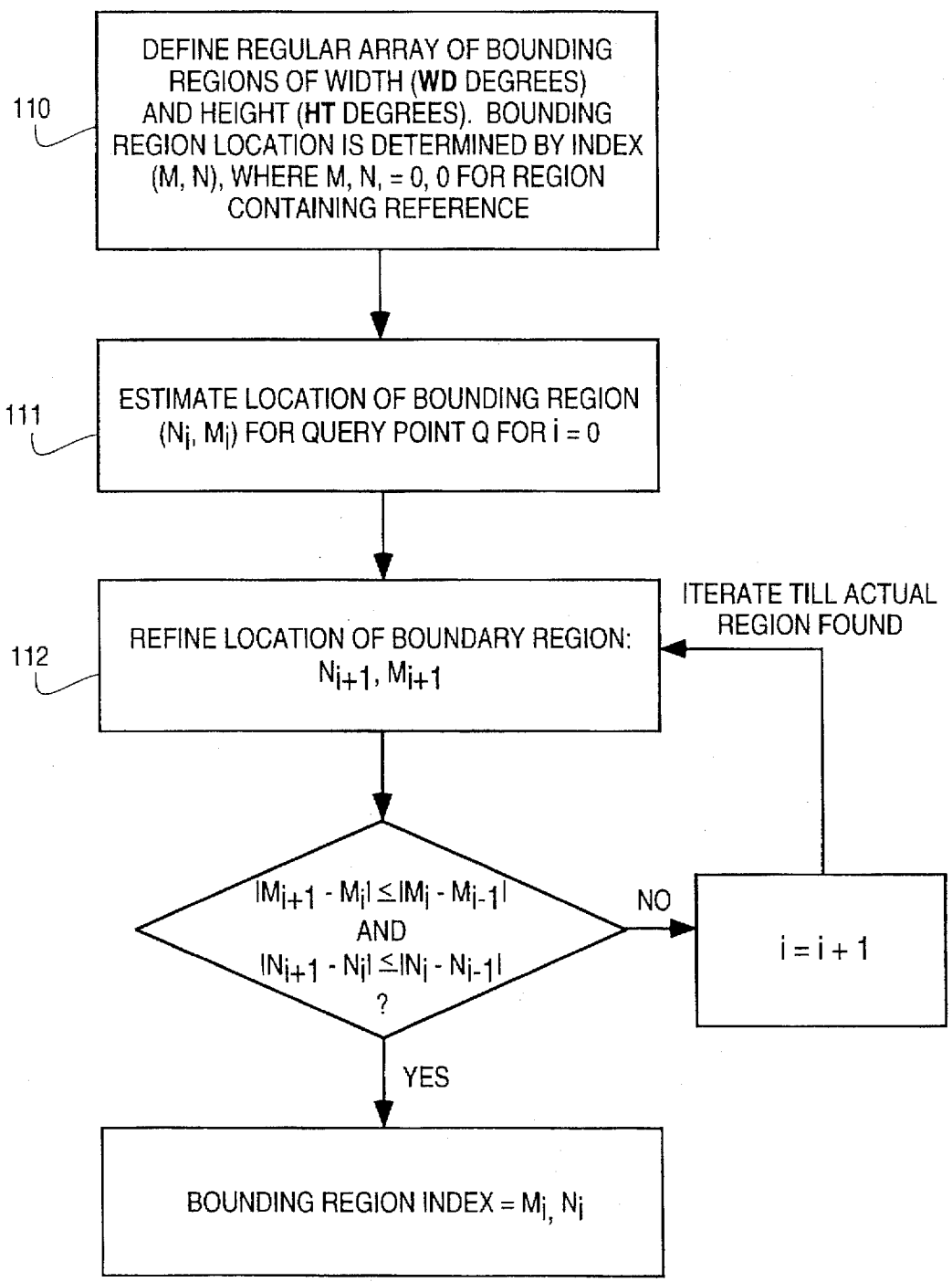
FIG. 6B illustrates in detail an initial step of the method of FIG. 6A.

As described subsequently, FIG. 6B illustrates in more detail method step 101 in connection with determining the bounding region. In accordance with step 110, M is defined as the number of regions to the east or west of the reference location and N is defined as the number of regions to the north or south of the reference location. M is negative west of the reference location region and N is negative south of the reference location region.

M and N are used to determine the latitude and longitude within the test region, given only the range and azimuth angle to a location within that region. M and N for the reference location or region are 0.

An initial start region and start point $(R_S)$ for a designated start range at scan line angle θ, is determined and then each subsequent query point along the scan line is determined out to the maximum range for the range interval. The following calculations shall be used to determine the start region and start point coordinates:

The start region is the region that contains the start point for the defined range interval.

M and N shall first be determined for the start region and then the start region number can be calculated using initial location or home region number and M/N. An initial rough calculation for M and N is made, as in step 111, and substituted into equations $N_{i+1}$ and $M_{i+1}$, which follow, that shall accurately determine them.

$$N_i = N_o = (1/HT) \text{SIN}^{-1}[Y_s/(R_o \times (1-(ep^2 \times \cos^2 HR)))]$$

$$M_i = M_o = (1/WD) \text{SIN}^{-1}[X_s/(R_o \times \cos(HR + N_o HT))]$$

Once $N_i$ and $M_i$ have been calculated substitute $N_i$ into the equation for $M_{i+1}$ and compute $N_{i+1}$ using $M_{i+1}$.

$$M_{i+1} = (1/WD)\text{SIN}^{-1}[X_s/(R_o \times \cos(HR + N_i \times HT))]$$

$$\begin{aligned}N_{i+1} = &(1/HT)\text{SIN}^{-1}[Y_s - (R_o \times (1-\cos(M_{i+1} \times WD)) \times \\ &\text{SIN}(HR) \times \cos(HR + N_i \times HT) \div \\ &R_o \times (1 - (ep^2 \times \cos^2(HR)))]\end{aligned}$$

This iterative process is continued, as in step 112, see following equations, until the solution converges.

The following equations further illustrate the process of FIG. 6B.

$$X_s = Rx \sin \theta$$

$$Y_s = Rx \cos \theta$$

where, R=start range for range interval, in feet
where,
Xs, Ys is the start range cell X, Y
R—start range in feet
θ—scan line angle in degrees
HR=latitude of the home region centroid in degrees
HT, WD=region height and width in degrees
$R_o = a \div (1-(ep \times \sin(HR))^2)^{1/2}$ in feet
ep=eccentricity of WGS-84 earth model (0.0818192)
a=semi major axis of WGS-84 earth model (20925646 ft)
The latitude of the home region centroid shall be calculated as follows:

$\phi_i = \phi_0 \div HT_{region}$ (truncate result to an integer)

$HR = \phi_i \times HT_{region} + (HT_{region} \div 2)$ If $\phi_0 \geq 0$ $HR = \phi_i \times HT_{region} - (HT_{region} \div 2)$ If $\phi_0 < 0$ where, $\phi_0$ is initial location latitude It will be understood that the case illustrated in FIG. 2 wherein the geodetic position of a selected query point or points is determined is a subset of the method illustrated in FIGS. 6A and 6B. As such, corresponding steps will be readily apparent to those of skill in the art.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for retrieving information stored in a first coordinate system corresponding to at least one target location specified relative to a second coordinate system comprising:

a database containing information stored in the first coordinate system;

an input device for providing a reference location defined in the first coordinate system and for providing indicia relative to the reference location, for defining at least one target location relative to the reference location but with respect to said second coordinate system;

processing means for establishing a region adjacent to at least said one target location including means for representing at least first and second points on said region with respect to said first coordinate system;

processing means for translating said representations of said points into representations with respect to said second coordinate system; and wherein said processing means includes means for establishing a representation of said target location in said first coordinate system using said translated representation of said points.

2. A system as in claim 1 wherein said database information represent geographic information.

3. A system as in claim 2 which includes a display device, coupled to said processing means, upon which indicia indicative of said at least one target location, retrieved from said database, can be visually exhibited.

4. A system as in claim 3 wherein said processing means includes means for altering said target location indicia in response to changes in said reference position.

5. A system as in claim 1 wherein said first coordinate system is a geodetic-type system and said second is a cartesian-type system.

6. A system as in claim 1 wherein said processing means defines a plurality of target locations along a selected direction with respect to the second coordinate system relative to the reference location defined in the first coordinate system.

7. A system as in claim 1 wherein said processing means includes means for establishing said region wherein at least said one target location is contained therein.

8. A system as in claim 1 wherein said processing means includes means for interactively evaluating a relationship between a current position of said region and said one target location.

9. A system as in claim 8 wherein said processing means includes further means for altering said current position of said region in response to said relationship.

10. A system as in claim 1 wherein said input device includes a communications link coupled to said processing means and a remote source.

11. A system as in claim 1 wherein said input device includes a manually operable member.

12. The system of claim 1 wherein the at least one target point is included in the adjacent region.

13. A simulator comprising:
a data output device;
an input device;
a processor coupled to said data output device and said input device;
a database containing information, stored with reference to a first coordinate system, and coupled to said processor wherein said processor includes means for establishing reference location relative to said first coordinate system and one or more target positions defined relative to said reference location but relative to a second, different, coordinate system, and for establishing a region defined in said first coordinate system which contains at least some of said one or more target positions.

14. A simulator as in claim 13 wherein said output device includes a visual display.

15. A simulator as in claim 14 wherein said processor includes further means for determining coordinates of said one or more target positions, relative to said first system, by use of one or more selected parameters of said region.

16. A simulator as in claim 14 wherein said first coordinate system corresponds to a geodetic-type system and said second coordinate system corresponds to a cartesian-type system.

17. A simulator as in claim 14 wherein said processor includes means for retrieving geographical data from said database, corresponding to said one or more target locations and for presenting indicia indicative thereof on said visual display.

18. A simulator as in claim 14 wherein said stored information corresponds to geographical information.

19. A simulator as in claim 14 wherein said input device includes a manually manipulatable portion.

20. The simulator of claim 13 wherein the processor is programmable.

21. A method of retrieving information stored in a first coordinate system corresponding to at least one target position specified relative to a second coordinate system comprising:
establishing a database relative to a first coordinate system;
establishing a reference location relative to the first coordinate system;
establishing at least one target location relative to said second coordinate system;
establishing a bounded region, relative to the first coordinate system adjacent to one target location;
determining at least first and second parameters of the region and determining the coordinates of the one target location, using the parameters, in the first coordinate system.

22. A method as in claim 21 wherein the position of the bounding region is relatively established so as to achieve a predetermined relationship with the one target location.

23. A method as in claim 21 wherein the one target location is contained within the bounded region.

24. A method as in claim 21 including establishing a bounding region defined by a regular grid.

25. A method as in claim 24 wherein the bounding region is as a rectangle.

26. A system for determining at least one target location in a first coordinate system specified relative to a second coordinate system comprising:
a processing device to establish a region associated with the at least one target location and to determine at least one point associated with the region with respect to the first coordinate system, the processing device translating the representations of the at least one point into the second coordinate system and establishing a representation of the at least one target location in the first coordinate system using the translated representation of the at least one point.

27. The system as in claim 26 further comprising a database containing information stored in the first coordinate system.

28. The system as in claim 26 wherein said processing device determines a plurality of points along a line extending from a reference point.

29. A method of retrieving information stored in a first coordinate system corresponding to at least one target position specified relative to a second coordinate system comprising:
establishing a database relative to the first coordinate system;
establishing at least one target location relative to the second coordinate system;
establishing a bounded region, relative to the first coordinate system, associated with the one target location; and
determining at least first and second parameters of the region and using the parameters to determine the coordinates of the one target location in the first coordinate system.

30. The method of claim 29 further comprising the step of establishing a reference location relative to the first coordinate system.

31. The method as in claim 29 wherein the bounded region encloses the target location.

32. The method of claim 31 further comprising the step of generating coordinates in the first coordinate system for a plurality of points within the bounded region, wherein the points were initially specified in the second coordinate system.

33. The method as in claim 31 further comprising the step of moving the bounded region in at least a first direction to enclose another target location.

34. An apparatus to determine a target position in a first coordinate system where the target position is represented in a second coordinate system comprising:
a processing device to receive the target position defined in the second coordinate system, the processing device determining a representation of the target position in the first coordinate system based upon at least one selected position and without converting all of the information in a database represented in a first coordinate system to the second coordinate system.

35. The apparatus of claim 34 wherein the at least one selected position is translated from the first coordinate system to the second coordinate system.

36. The apparatus of claim 34 wherein the processing device determines a boundary region associated with the target position.

37. The apparatus of claim 36 wherein the boundary region intersects a line extending at a selected angle from a reference position.

38. The apparatus of claim 37 wherein the processing device determines at least one position where the line intersects the boundary region.

39. The apparatus of claim 36 wherein the processing device determines a second selected position associated with the boundary region.

40. The apparatus of claim 36 wherein the processing device determines at least one point of the boundary region relative to a reference position.

41. The apparatus of claim 36 wherein the processing device determines first and second points where a line intersects with the boundary region.

42. The apparatus of claim 41 wherein the processing device translates the first and second points into the first coordinate system by interpolating from at least one point on the boundary region.

43. The apparatus of claim 42 wherein the processing device determines the target position by interpolating between the first and second points.

* * * * *